United States Patent [19]
Yamada et al.

[11] 4,405,481
[45] Sep. 20, 1983

[54] MAGNETIC RECORDING MEDIUM

[75] Inventors: Yasuyuki Yamada; Nobuo Tsuji, both of Odawara; Tsutomu Okita, Fujinomiya; Yasuo Mukunoki, Minami-ashigara, all of Japan

[73] Assignee: Fuji Photo Film Co., Ltd., Kanagawa, Japan

[21] Appl. No.: 220,215

[22] Filed: Dec. 24, 1980

[30] Foreign Application Priority Data

Dec. 28, 1979 [JP] Japan ................................ 54-173625

[51] Int. Cl.³ ............................................... B05D 5/12
[52] U.S. Cl. .............................. 252/62.54; 252/62.53
[58] Field of Search ........................... 252/62.51–62.54

[56] References Cited

U.S. PATENT DOCUMENTS 3,704,152 11/1972 Hartmann et al. ........... 204/62.54 X
4,020,236 4/1977 Aonuma et al. ..................... 428/457
4,172,176 10/1979 Tanaka et al. ....................... 428/411
4,247,407 1/1981 Naruse et al. ..................... 252/62.54

*Primary Examiner*—F. Edmundson
*Attorney, Agent, or Firm*—Sughrue, Mion, Zinn, Macpeak and Seas

[57] ABSTRACT

A magnetic recording medium containing a ferromagnetic powder, a binder and a lubricant is disclosed. The lubricant comprises (1) abrasive particles having a Mohs' hardness of about 6 or more and a particle size of about 5 microns or less and (2) an ester of an aliphatic acid having 20 to 26 carbon atoms and a monovalent alcohol having 1 to 26 carbon atoms.

9 Claims, No Drawings

MAGNETIC RECORDING MEDIUM

BACKGROUND OF THE INVENTION

1. Field of the Invention

This invention relates to a magnetic recording medium which comprises a non-magnetic support coated with a ferromagnetic powder in the presence of a binder and other optional additives, more particularly, this invention relates to a lubricant for such a magnetic recording medium.

2. Description of the Prior Art

Magnetic recording media such as magnetic tapes generally comprise a base such as a polyester that is coated with a magnetic composition composed of a mixture of a ferromagnetic powder and a binder and other optional materials. Two important properties of magnetic recording media are high wear resistance and high lubricity.

The conventional way of providing magnetic recording media with high wear resistance and lubricity is to use aliphatic acids, aliphatic acid esters, paraffin waxes, metallic soaps, higher alcohols, aliphatic acid derivatives, fluorine-containing compounds, silicon-containing compounds, boron-containing compounds and abrasives, but these compounds are not completely satisfactory.

SUMMARY OF THE INVENTION

One object of this invention is to provide a magnetic recording medium having high wear resistance and high lubricity.

This object is achieved by forming a magnetic recording medium using a ferromagnetic powder, a binder and a lubricant that comprises abrasive particles having a Mohs' hardness of about 6 or more and a particle size of about 5 microns or less and an ester of an aliphatic acid having 20 to 26 carbon atoms and a monovalent alcohol having 1 to 26 carbon atoms.

DETAILED DESCRIPTION OF THE INVENTION

According to this invention, an abrasive having a Mohs' hardness of about 6 or more, preferably 6 or more, and a particle size of about 5 microns or less, preferably 5 microns or less, is used in an amount of about 0.1 to about 10 parts by weight, preferably from 0.3 to 8 parts by weight, per 100 parts by weight of the magnetic powder. The aliphatic acid ester is used in an amount of from about 0.1 to about 8 parts by weight, preferably from 0.3 to 6 parts by weight, per 100 parts by weight of the magnetic powder. The abrasive must preferably has a particle size between 0.05 and 1.5 microns. It is to be specifically noted that the maximum Mohs' hardness of the abrasive is not limited since the objects of the present invention can be obtained so long as the abrasive particles have a Mohs' hardness of 6 or more.

While the above abrasive particles used along may provide a magnetic tape with high wear resistance, the tape running property is so unstable that even a slight change in friction during running can cause tape squeal. On the other hand, if the aliphatic acid ester lubricant is used alone, both high wear resistance and lubricity cannot be achieved. Their joint use, however meets the objects of the invention.

If the amounts of the abrasive and ester used are smaller than the above defined lower limits, their effect is not as distinct as expected, while if the amounts thereof are greater than the above-defined upper limits, excessive head wear results. If the aliphatic acid ester is used in an excessive amount, the resulting high coefficient of friction makes the tape run unstably and provides a soft tape that is low in wear resistance.

Illustrative abrasives (non-magnetic) having a Mohs' hardness of 6 or more include diamond, emery, spinel, garnet, flint, iron oxides, chromium oxides, alumina, silicon carbide and boron carbide. Chromium oxide ($Cr_2O_3$), alumina and silicon carbide are preferred.

Preferred examples of the aliphatic acid ester include ethyl erucate, butyl erucate, butoxyethyl erucate, butyl behenate, butoxyethyl behenate, octyl behenate and 2-ethylhexyl behenate.

This invention is described in greater detail by reference to the following examples and comparative examples which are given here for illustrative purposes only and are by no means intended to limit the scope of the invention. In the examples, all parts are by weight.

EXAMPLE 1

| | |
|---|---|
| Co-containing $\gamma$-$Fe_2O_3$ (particle size: 0.3$\mu$ Hc: 620 oe) | 100 parts |
| Nitrocellulose (Rs: ½) | 7 parts |
| Vinyl chloride-vinyl acetate copolymer (VAGH; tradename for a product of the Union Carbide Corporation) | 10 parts |
| Polyurethane | 8 parts |
| SiC (particle size: 0.6$\mu$) | 7 parts |
| Butyl erucate | 3 parts |
| Methyl ethyl ketone/toluene/anone (wt. ratio = 1:1:1) | 270 parts |

A coarse dispersion of the formulation indicated above was milled in a sand mill to provide a uniform dispersion which was applied to a subbed polyester film (19$\mu$) at a dry thickness of 5$\mu$. After the application, the film was dried and subjected to calendering and other conventional tape making techniques to provide ½-inch tape samples #1. All samples were found to have good running properties and good wear resistance in evaluation on a VTR (trade name Victor HR-3600) at two different conditions, i.e. at 23° and 70% RH, and at 5° C. and 80% RH.

EXAMPLE 2

Samples #2 were prepared by repeating the procedure of Example 1 except that SiC and butyl erucate were replaced by $Al_2O_3$ (particle size: 0.5$\mu$) and butoxyethyl erucate, respectively. On evaluation, all samples had good running properties and good wear resistance.

EXAMPLE 3

Samples #3 were prepared by repeating the procedure of Example 1 except that 5 parts of SiC were used and butyl erucate was replaced by butyl behenate. All samples had good running properties and good wear resistance on evaluation.

EXAMPLE 4

Samples #4 were prepared by repeating the procedure of Example 1 except that butyl erucate was replaced by a 60:40 mixture of butyl erucate and butyl behenate. Upon evaluation, all samples were found to have good running properties and good wear resistance.

COMPARATIVE EXAMPLE 1

Samples #A were prepared by repeating the procedure of Example 1 except that no SiC was used. On evaluation, all samples had good running properties but wear resistance was low.

COMPARATIVE EXAMPLE 2

Samples #B were prepared by repeating the procedure of Example 2 except that no butoxyethyl erucate was used. On evaluation, all samples had good wear resistance but their running properties were low and tape squeal was heard on the 15th running.

COMPARATIVE EXAMPLE 3

Samples #C were prepared by repeating the procedure of Example 3 except that butyl behenate was replaced by butyl stearate. All samples had good running properties and wear resistance at 23° C. and 70% RH, but at 5° C. and 80% RH, the tape stuck in the head assembly and no image appeared on the CRT used, indicating that the tape surface had worn out in some fashion.

COMPARATIVE EXAMPLE 4

The same results were obtained with samples prepared by repeating the procedure of Comparative Example 3 except that butyl stearate was replaced by octyl stearate.

These examples and comparative examples are only a few of a host of experiments were conducted and it is to be understood that the scope of this invention is not limited to these examples and comparative examples.

In addition to Co-containing $\gamma$-$Fe_2O_3$, the ferromagnetic powder used in this invention may comprise a number of different materials as are commonly used in the art. Illustrative ferromagnetic materials useful herein are disclosed in U.S. Pat. No. 4,135,016 Ogawa et al. (Ogawa), hereby incorporated by reference. Most preferred ferromagnetic materials include $\gamma$-$Fe_2O_3$, various alloys as are disclosed in the Ogawa patent incorporated by reference, most preferably a Fe-Co alloy, $CrO_2$ and $Fe_3O_4$. Since the essence of the present invention was resides in the lubricant, one skilled in the art will appreciate the ferromagnetic powder is not limited in any substantial fashion. Most preferably the fine ferromagnetic powder has a particle size between 0.1 and 2.0 microns. Conventional formulations may be used to prepare the binder, and polyisocyanates are preferred for controlling tape stiffness, with other preferred binders including nitrocellose, vinyl chloride-vinyl acetate resins and polyurethane resins. In a manner similar to the ferromagnetic powder, the binder also is not unduly limited, and many useful materials are disclosed in the above Ogawa patent incorporated by reference. The magnetic recording layer of the present invention preferably has a thickness of from about 1 to about 10 microns, most preferably from 3 to 6 microns. Although not limitative, usually best results are obtained when 20 to 35 parts by weight of binder is used per 100 parts by weight of ferromagnetic powder. The magnetic recording medium of this invention may contain conventional antistatic agents such as carbon black and/or conventional dispersants for magnetic powders such as lecithin. Further, the ratio of ferromagnetic powder to binder is not unduly limited, but preferred ratios are given in the Ogawa patent incorporated by reference. It is also to be understood that solvents other than that illustrated in the examples may be used, for example, as disclosed in the Ogawa patent incorporated by reference.

What is claimed is:

1. A magnetic recording medium containing one or more ferromagnetic powders, one or more binders and a lubricant, said lubricant comprising (1) non-magnetic abrasive particles having a Mohs' hardness of about 6 or more and a particle size of about 5 microns or less and (2) one or more esters selected from the group consisting of ethyl erucate, butyl erucate, butoxyethyl erucate, butyl behenate, butoxyethyl behenate, octyl behenate and 2-ethylhexyl behenate.

2. A magnetic recording medium according to claim 1 wherein the abrasive particles are selected from the group consisting of diamond, emery, spinel, garnet, flint, iron oxides, chromium oxides, alumina, silicon carbide, boron carbide and mixtures thereof.

3. A magnetic recording medium according to claim 1 wherein the one or more fine ferromagnetic powders are selected from the group consisting of $\gamma$-$Fe_2O_3$, alloys, $CrO_2$, $Fe_3O_4$ and Co-containing $\gamma$-$Fe_2O_3$.

4. A magnetic recording medium according to claim 1 wherein the one or more fine ferromagnetic powders have a particle size between 0.1 and 2.0 microns.

5. A magnetic recording medium according to claim 1 wherein the fine ferromagnetic powder is a Fe-Co alloy.

6. A magnetic recording medium according to claim 1 wherein the binder is selected from the group consisting of nitrocellulose, a vinyl chloride-vinyl acetate resin or a polyurethane resin.

7. A magnetic recording medium according to claim 1 wherein the abrasive particles are $Cr_2O_3$, $Al_2O_3$ and SiC, and the ester is selected from the group consisting of butyl erucate, butoxyethyl erucate and butyl behenate.

8. A magnetic recording medium according to claim 1 which further comprises carbon black.

9. A magnetic recording medium according to claim 1 wherein 20 to 35 parts by weight of the binder is present per 100 parts by weight of the fine ferromagnetic powder.

* * * * *